United States Patent
Lee et al.

(10) Patent No.: US 9,840,285 B2
(45) Date of Patent: Dec. 12, 2017

(54) FRONT VEHICLE BODY AND METHOD OF FABRICATING FRONT VEHICLE BODY

(71) Applicant: HYUNDAI MOTOR COMPANY, Seoul (KR)

(72) Inventors: Hae Hoon Lee, Goyang-si (KR); Hong Soek Yeon, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 86 days.

(21) Appl. No.: 14/954,751

(22) Filed: Nov. 30, 2015

(65) Prior Publication Data

US 2017/0021867 A1    Jan. 26, 2017

(30) Foreign Application Priority Data

Jul. 24, 2015   (KR) .................. 10-2015-0105027

(51) Int. Cl.
    *B62D 25/00*    (2006.01)
    *B62D 25/08*    (2006.01)
(52) U.S. Cl.
    CPC ................. *B62D 25/082* (2013.01)
(58) Field of Classification Search
    CPC .................................................. B62D 25/082
    USPC ............. 296/187.09, 187.1, 187.12, 193.09, 296/193.05, 203.02, 203.03, 198
    See application file for complete search history.

(56) References Cited

U.S. PATENT DOCUMENTS

2014/0049069 A1*   2/2014   Park ................... B62D 25/082
                                                  296/187.09

FOREIGN PATENT DOCUMENTS

| EP | 2105372 A1 | 9/2009 |
| JP | 2013-112305 A | 6/2013 |
| JP | 2013-220738 A | 10/2013 |
| JP | 2013-226867 A | 11/2013 |
| JP | 2014-189045 A | 10/2014 |
| JP | 2015-054689 A | 3/2015 |
| KR | 10-2014-0024654 A | 3/2014 |
| KR | 10-2014-0087256 A | 7/2014 |

OTHER PUBLICATIONS

Korean Notice of Allowance dated Feb. 14, 2017 in regard to the corresponding Korean patent application No. 10-2015-0105027.
Korean Office Action dated Aug. 22, 2016, issued in Korean Patent Application No. 10-2015-0105027.

* cited by examiner

*Primary Examiner* — Joseph D Pape
(74) *Attorney, Agent, or Firm* — McDermott Will & Emery LLP

(57) ABSTRACT

A front vehicle body includes a side member including a side member inner panel and a side member outer panel, a first reinforcing member, one end of which penetrates the side member and is coupled to the side member inner panel, and an intermediate portion of which is coupled to the side member outer panel, and a fender apron member disposed outside the side member and coupled to the other end of the first reinforcing member.

9 Claims, 3 Drawing Sheets

[FIG. 1]
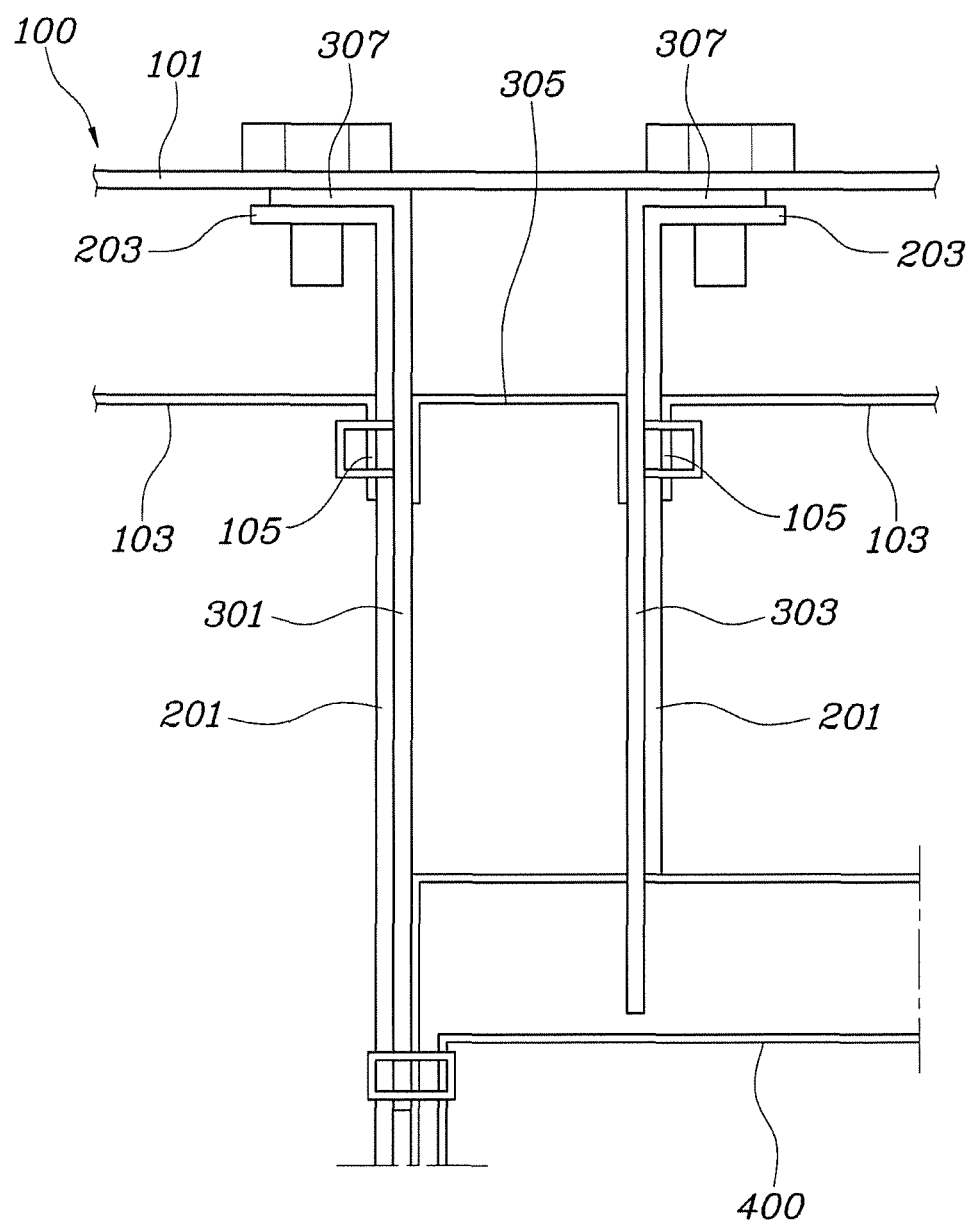

[FIG. 2]
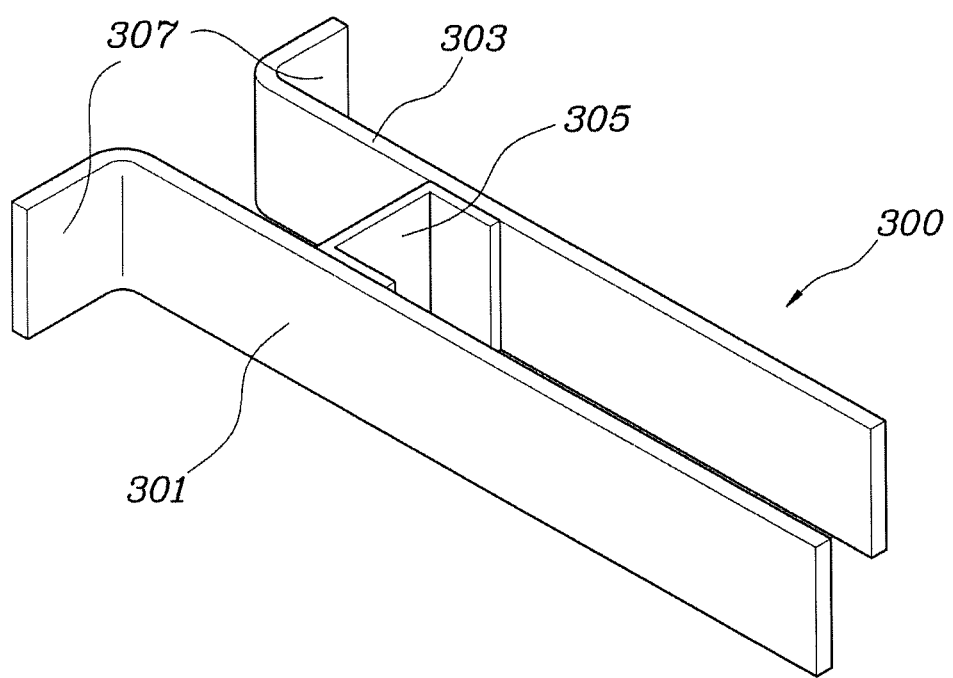

[FIG. 3]
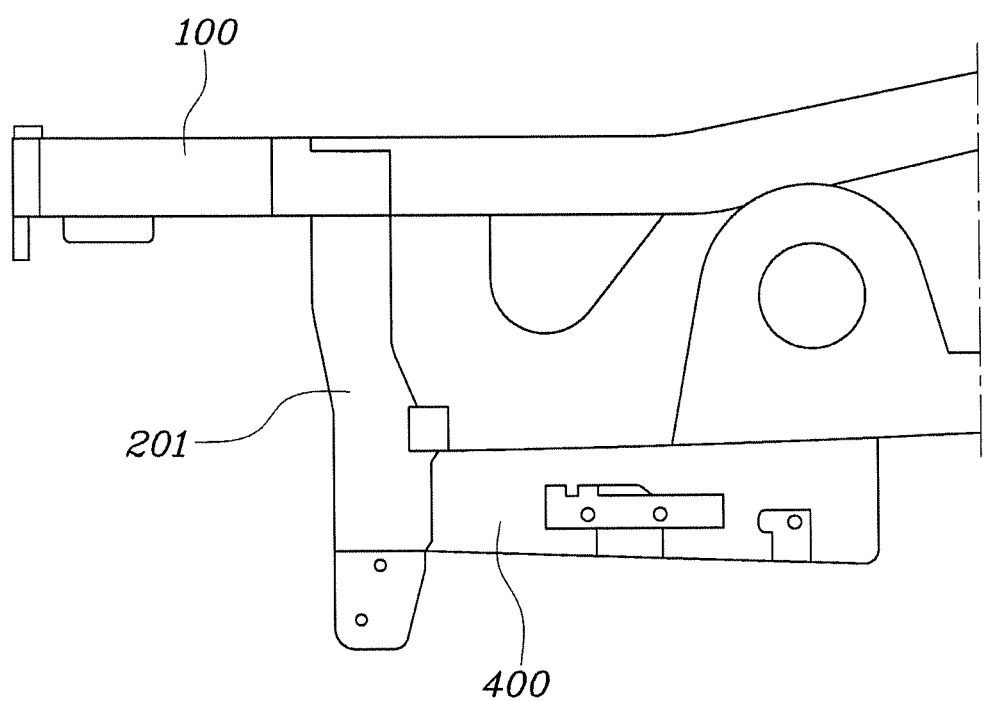

FRONT VEHICLE BODY AND METHOD OF FABRICATING FRONT VEHICLE BODY

CROSS-REFERENCE TO RELATED APPLICATION

This application claims the benefit of priority to Korean Patent Application No. 10-2015-0105027, filed on Jul. 24, 2015 with the Korean Intellectual Property Office, the disclosure of which is incorporated herein by reference.

TECHNICAL FIELD

The present disclosure relates to a design of a front vehicle body, and more particularly to a front vehicle body, which is constructed to efficiently distribute impact upon collision.

BACKGROUND

Design technology for a front vehicle body has been developed so as to absorb impacts applied to a vehicle upon collision and to block the transmission of the impact to the interior of the vehicle for the purpose of ensuring passengers' safety. More specifically, the front vehicle body is constructed so as to collapse in the manner of an accordion due to an impact transmitted thereto upon collision so as to absorb the impact and prevent transmission thereof to the interior of the vehicle, thereby preventing contraction of the passenger compartment of the vehicle for the purpose of ensuring passengers' safety. However, there is a tradeoff between impact absorption and the provision of sufficient interior space in the vehicle, and thus satisfying both requirements is the essential goal of related design technologies. Specifically, when the front side member is designed to have a high strength, the function of absorbing an impact is deteriorated. Meanwhile, when the front side member is designed to have a low strength, the function of absorbing impact is improved but it is difficult to ensure sufficient interior space in the vehicle, and thus improving the passengers' safety.

In the case of a partial frontal collision, it is critical to efficiently transmit impact that is locally applied to a vehicle body to a side member constituting the framework of the vehicle. In particular, upon partial collision, the size of the interior space of the vehicle is greatly affected by how efficiently the impact is transmitted to the side member, which includes a fender apron member constituting the framework.

The matter disclosed in this section is merely for enhancement of understanding of the general background of the disclosure, and should not be taken as an acknowledgment or any form of suggestion that the matter forms the related art already known to a person skilled in the art.

SUMMARY OF THE DISCLOSURE

Therefore, the present disclosure has been made in view of the above problems, and it is an object of the present disclosure to provide a front vehicle body, which is constructed so as to efficiently distribute impact in the event of a collision.

In accordance with the present disclosure, the above and other objects can be accomplished by the provision of a front vehicle body including a side member including a side member inner panel and a side member outer panel, a first reinforcing member, one end of which penetrates the side member and is coupled to the side member inner panel and an intermediate portion of which is coupled to the side member outer panel, and a fender apron member disposed outside the side member and coupled to the other end of the first reinforcing member.

The front vehicle body may further include a second reinforcing member fitted in the first reinforcing member, one end of which is coupled to the side member inner panel, together with the first reinforcing member, and the other end of which is coupled to the fender apron member, together with the first reinforcing member.

The second reinforcing member may include a pair of panels and a bulkhead connected between the pair of panels.

The pair of panels may be made of carbon fiber-reinforced plastic, and the bulkhead may be made of steel.

The bulkhead may be positioned in the first reinforcing member so as to be aligned with the side member outer panel.

The side member outer panel may include a flange provided at a through hole formed therein, and the flange may be coupled to the intermediate portion of the first reinforcing member in a surface-contact manner.

The first reinforcing member may include a flange formed at one end thereof, which is coupled to an inner surface of the side member inner panel in a surface-contact manner.

The first and second reinforcing members may include respective flanges formed at one ends thereof, the flange of the second reinforcing member being coupled to the inner surface of the side member inner panel in a surface-contact manner and the flange of the first reinforcing member being coupled to the flange of the second reinforcing member in a surface-contact manner.

The pair of panels of the second reinforcing member may have different lengths, in which the longer of the pair of panels is coupled to an end of the fender apron member and the shorter of the pair of panels penetrates the inner wall of the fender apron member and is coupled thereto.

In accordance with another aspect of the present disclosure, there is provided a method of fabricating the front vehicle body, the method including coupling the intermediate portion of the first reinforcing member to the side member outer panel, fitting the second reinforcing member into the first reinforcing member, coupling one end of the first reinforcing member and one end of the second reinforcing member to the fender apron member, and coupling the other end of the first reinforcing member and the other end of the second reinforcing member to the side member inner panel.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic view of a front vehicle body according to an embodiment of the present disclosure;

FIG. 2 is a perspective view of a second reinforcing member of the front vehicle body according to the embodiment of the present disclosure; and FIG. 3 is a plan view of the front vehicle body according to the embodiment of the present disclosure.

DETAILED DESCRIPTION

Reference will now be made in detail to the preferred embodiments of the present disclosure, examples of which are illustrated in the accompanying drawings.

FIG. 1 is a schematic view showing the structure of a front vehicle body according to an embodiment of the present disclosure. FIG. 2 is a perspective view of a second reinforcing member 300 of the front vehicle body according to the embodiment of the present disclosure. FIG. 3 is a plan view of the front vehicle body according to the embodiment of the present disclosure.

As shown in the drawings, the front vehicle body according to the present disclosure may include a side member 100 composed of a side member inner panel 101 and a side member outer panel 103, first reinforcing members 201, one end of each of which extends through the side member 100 and is coupled to the side member inner panel 101 and an intermediate portion of each of which is coupled to the side member outer panel 103, and a fender apron member 400 disposed outside the side member 100 and coupled to the other end of each of the first reinforcing members 201.

The side member 100 includes the side member inner panel 101 and the side member outer panel 103. The one end of each first reinforcing member 201 extends through the side member 100 and is coupled to the side member inner panel 101, and the intermediate portion of each first reinforcing member 201 is coupled to the side member outer panel 103. The fender apron member 400 is coupled to the other end of each first reinforcing member 201.

In a conventional automotive technology, the side member 100 and the reinforcing member were merely welded to the outer surface of the side member outer panel 103. In this case, upon a frontal collision, the impact of the collision was not sufficiently transmitted to the side member 100 but was concentrated on the welded portion, thus causing the welded portion to be easily broken. As a result, there was the occurrence of severe damage of A pillars and the portions of the body near passengers' seats.

Referring to FIG. 1, the front vehicle body according to an embodiment of the present disclosure is constructed such that each first reinforcing member 201 extends through the side member outer panel 103 and is coupled to the side member inner panel 101. Consequently, upon a partial frontal collision, the number of connecting points where the impact of the collision can be transmitted to the side member 100 is increased, thus efficiently distributing the impact. Specifically, the breakage of the connecting portions is prevented by virtue of the mechanical coupling as well as the bonding force of the weldment between the side member 100 and the first reinforcing members 201, thus enabling the impact of collision to be efficiently transmitted.

Furthermore, the side member outer panel 103 may be divided into a front outer panel part and a rear outer panel part based on the area where the first reinforcing members 201 extend through the side member outer panel 103 such that the divided outer panel parts are configured to have different thicknesses, or are molded from different materials if necessary.

The front vehicle body according to the embodiment of the present disclosure may further include a second reinforcing member 300 fitted between the first reinforcing members 201 so as to contact the inner surfaces thereof, one end of which is coupled to the side member inner panel 101, together with the first reinforcing members 201, and the other end of which is coupled to the fender apron member 400, together with the first reinforcing members 201.

Referring to FIGS. 1 and 2, since the second reinforcing member 300 is fitted between the first reinforcing members 201 to contact the inner surfaces thereof, the strength of the first reinforcing members 201 is supplemented by the second reinforcing member 300. When the first reinforcing members extend through the side member outer panel 103 and are coupled to the side member inner panel 101, unlike a conventional front vehicle body in which the second reinforcing member is simply coupled to the surface of the side member outer panel 103, the impact resulting from a collision is typically concentrated on the intermediate portions of the first reinforcing members 201 where the first reinforcing members 201 meet the side member outer panel 103. Hence, the first reinforcing members 201 are easily bent at the intermediate portions, thus hindering the efficient transmission of the impact to the side member 100. For this reason, there is a necessity to increase the strength of the first reinforcing members 201.

To this end, although the first reinforcing members 201 may be made of a material having a higher strength or may be configured to have an increased thickness, the solutions have adverse effects of increasing production costs and deteriorating moldability due to the increased thickness. In contrast, the embodiment of the present disclosure makes it possible to efficiently support the load concentrated on the intermediate portions of the first reinforcing members 201 by fitting the second reinforcing member 300 between the first reinforcing members 201 for reinforcement of the first reinforcing members 201.

The second reinforcing member 300 may include a pair of panels 301 and 303 and a bulkhead 305 connected between the pair of panels 301 and 303. The pair of panels 301 and 303 may be molded from carbon fiber-reinforced plastic, and the bulkhead 305 may be made of steel. The bulkhead 305 may be positioned between the first reinforcing members 201 so as to be aligned with the side member outer panel 103.

Referring to FIG. 2, the second reinforcing member 300 may include the pair of panels 301 and 303 and the bulkhead 305 connected between the pair of panels 301 and 303, which are configured to have an shape. The portion of the first reinforcing members 201 that is required to be reinforced is the intermediate portion where the first reinforcing members 201 meet the side member outer panel 103. Thanks to the use of the second reinforcing member 300 composed of the pair of panels 301 and 303 and the bulkhead 305 connected between the pair of panels 301 and 303, it is possible to supplement the strength of the first reinforcing members 201 while preventing unwanted increases in weight and cost.

In particular, the pair of panels 301 and 303 of the second reinforcing member 300 are made of carbon fiber-reinforced plastic to prevent an increase in weight. Furthermore, the bulkhead 305 connected between the pair of panels 301 and 303 is assembled to be aligned with the side member outer panel 103 in order to mechanically attenuate the stress concentrated on the intermediate portion of the first reinforcing member 201, thus allowing impacts to be more efficiently transmitted.

The side member outer panel 103 has a through hole, at which flanges 105 are formed, such that the flanges 105 are coupled to the intermediate portion of the first reinforcing members 201 in a surface-contact manner.

In other words, since the flanges 105 are provided at the through hole of the side member outer panel 103 and are coupled to the intermediate portion of the first reinforcing member 201 in a surface-contact manner, the coupling strength is increased. Furthermore, since the contact area between the side member outer panel 103 and the intermediate portion of the first reinforcing members 201 is increased, it is possible to diminish the concentration of stress in the event of a collision.

Each of the first reinforcing members 201 is provided at one end thereof with a flange 203, which is coupled to the inner surface of the side member inner panel 101 in a surface-contact manner. Each of the first reinforcing members 201 may be provided at one end thereof with the flange 203, and the second reinforcing member 300 may be provided at one end thereof with the flange 307. The flange 307 of the second reinforcing member 300 may be coupled to the inner surface of the side member inner panel 101 in a surface-contact manner, and the flange 203 of the first reinforcing member 201 may be coupled to the flange 307 of the second reinforcing member 300 in a surface-contact manner.

By provision of the flange 203 at the one end of the first reinforcing member 201, it is possible to provide sufficient area to couple the first reinforcing member 201 to the side member inner panel 101. Furthermore, by the provision of the flange 307 at the one end of the second reinforcing member 300, it is possible to provide sufficient area to couple the first reinforcing member 201 to the side member inner panel 101. Consequently, the coupling strength between the first reinforcing members 201 and the side member inner panel 101 is increased, thus allowing an impact generated by a collision to be sufficiently transmitted to the side member 100.

The pair of panels of the second reinforcing member 300 have different lengths. The longer panel 301 may be coupled to the end of the fender apron member 400, and the shorter panel 303 may penetrate the fender apron member 400 and may be coupled thereto.

Referring to FIG. 1 or 3, one of the pair of panels 301 and 303 of the second reinforcing member 300 is configured to be longer than the other. The longer panel 301 is coupled to the end of the fender apron member 400, and the shorter panel 303 penetrates the inner wall of the fender apron member 400 and is mechanically coupled thereto. Accordingly, in the event of a collision, the impact applied to the fender apron member 400 may be sufficiently transmitted to the first reinforcing members 201 and the second reinforcing member 300.

Hereinafter, the method of fabricating the front vehicle body will be described.

The method of fabricating the front vehicle body may include a first operation of coupling the intermediate portions of the first reinforcing members 201 to the side member outer panel 103, a second operation of fitting the second reinforcing member 300 between the first reinforcing members 201, a third operation of coupling one end of each of the first reinforcing members 201 and one end of the second reinforcing member 300 to the fender apron member 400, and a fourth operation of coupling the other end of each of the first reinforcing members 201 and the other end of the second reinforcing member 300 to the side member inner panel 101.

In other words, in the first operation, the intermediate portions of the first reinforcing members 201 are coupled to the side member outer panel 103. In the second operation, the second reinforcing member 300 is fitted between the first reinforcing members 201. In the third operation, one end of each of the first reinforcing members 201 and one end of the second reinforcing member 300 are coupled to the fender apron member 400. In the fourth operation, the other end of each of the first reinforcing members 201 and the other end of the second reinforcing member 300 are coupled to the side member inner panel 101.

When the fabricating order is incorrectly executed, adverse effects may occur in that fabrication is impossible or the production rate is deteriorated due to unnecessary additional procedures. When the front vehicle body is fabricated in the above-mentioned sequence, it is possible to prevent the fabricating sequence from being disordered and to prevent the fabrication from becoming impossible.

As is apparent from the above description, the present disclosure provides a front vehicle body and a method of fabricating the same, which provide a vehicle with sufficient interior space to ensure passengers' safety.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A front vehicle body comprising:
a side member including a side member inner panel and a side member outer panel;
a first reinforcing member, one end of which penetrates the side member and is coupled to the side member inner panel, and an intermediate portion of which is coupled to the side member outer panel;
a fender apron member disposed outside the side member and coupled to the other end of the first reinforcing member; and
a second reinforcing member fitted in the first reinforcing member, one end of which is coupled to the side member inner panel, together with the first reinforcing member, and the other end of which is coupled to the fender apron member, together with the first reinforcing member.

2. The front vehicle body according to claim 1, wherein the second reinforcing member includes a pair of panels and a bulkhead connected between the pair of panels.

3. The front vehicle body according to claim 2, wherein the pair of panels are made of carbon fiber-reinforced plastic, and the bulkhead is made of steel.

4. The front vehicle body according to claim 2, wherein the bulkhead is positioned in the first reinforcing member so as to be aligned with the side member outer panel.

5. The front vehicle body according to claim 1, wherein the side member outer panel includes a flange provided at a through hole formed therein, and the flange is coupled to the intermediate portion of the first reinforcing member in a surface-contact manner.

6. The front vehicle body according to claim 1, wherein the first reinforcing member includes a flange formed at one end thereof, which is coupled to an inner surface of the second reinforcing member in a surface-contact manner.

7. The front vehicle body according to claim 1, wherein the first and second reinforcing members include respective flanges formed at one end thereof, the flange of the second reinforcing member being coupled to an inner surface of the side member inner panel in a surface-contact manner and the flange of the first reinforcing member being coupled to the flange of the second reinforcing member in a surface-contact manner.

8. The front vehicle body according to claim 2, wherein the pair of panels of the second reinforcing member have different lengths, in which a longer panel of the pair of panels is coupled to an end of the fender apron member and a shorter panel of the pair of panels penetrates an inner wall of the fender apron member and is coupled thereto.

9. A method of fabricating the front vehicle body according to claim 1, the method comprising:

coupling the intermediate portion of the first reinforcing member to the side member outer panel;
fitting the second reinforcing member into the first reinforcing member;
coupling one end of the first reinforcing member and one end of the second reinforcing member to the fender apron member; and
coupling the other end of the first reinforcing member and the other end of the second reinforcing member to the side member inner panel.

* * * * *